W. SANDLIN.
Cotton-Scrapers.

No. 155,893.  Patented Oct. 13, 1874.

WITNESSES:  
Francis McArdle.  
C. Sedgwick

INVENTOR:  
W. Sandlin  
BY Munn  
ATTORNEYS.

UNITED STATES PATENT OFFICE.

WILLIAM SANDLIN, OF MINDEN, LOUISIANA.

IMPROVEMENT IN COTTON-SCRAPERS.

Specification forming part of Letters Patent No. 155,893, dated October 13, 1874; application filed July 11, 1874.

*To all whom it may concern:*

Figure 1:
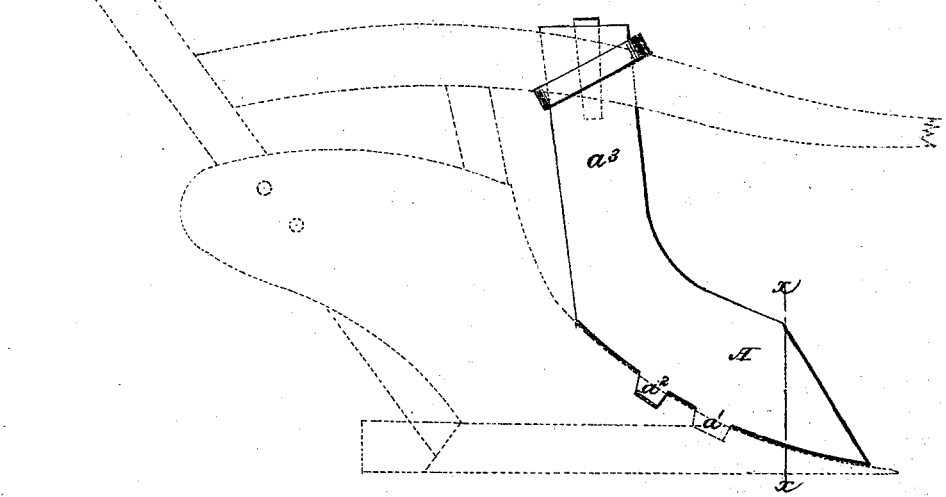
Figure 2:

Be it known that I, WILLIAM SANDLIN, of Minden, Webster parish, Louisiana, have invented a new and useful Improvement in Cotton-Scraper, of which the following is a specification:

Figure 1 is a side view of my improved scraper; and Fig. 2 is a front view of the same, partly in section, through the line $x\,x$, Fig. 1.

Similar letters of reference indicate corresponding parts.

The invention will first be fully described, and then pointed out in the claim.

A is the scraper, the lower edge of which is so formed as to fit upon the colter of the plow, and is provided upon said lower edge with two lugs, $a^1$ and $a^2$, one, $a^1$, of which rests against the land-side of said colter, and the other, $a^2$, upon its upper side, as shown in Figs. 1 and 2.

The scraper A is so formed as to guide the soil and weeds removed by it back to the mold-board of the plow along which they pass, and are covered by the soil.

Upon the rear end of the scraper A is formed a shank or standard, $a^3$, which extends up to the plow-beam, and may be secured to it by a band and wedge, by screw-bolts, by clamps, or other convenient fastenings.

Having thus described my invention, I claim as new and desire to secure by Letters Patent—

The concave scraper A, provided with lug $a^1$ that rests against land-side, lug $a^2$ that rests upon the upper side, and shank $a^3$, as shown and described.

WILLIAM SANDLIN.

Witnesses:
    WILL. S. LEWIS,
    JNO. B. WALTHALL.